US010368682B2

(12) United States Patent
Radhakrishnan et al.

(10) Patent No.: US 10,368,682 B2
(45) Date of Patent: Aug. 6, 2019

(54) BREWER

(71) Applicant: BUNN-O-MATIC CORPORATION, Springfield, IL (US)

(72) Inventors: Suresh Radhakrishnan, Springfield, IL (US); Jason Ray Lieving, Springfield, IL (US); Daniel Hansen, Springfield, IL (US); Rex Allen Rogers, Springfield, IL (US); John Bodjack, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 121 days.

(21) Appl. No.: 14/374,451

(22) PCT Filed: Jan. 23, 2013

(86) PCT No.: PCT/US2013/022682
§ 371 (c)(1),
(2) Date: Jul. 24, 2014

(87) PCT Pub. No.: WO2013/116056
PCT Pub. Date: Aug. 8, 2013

(65) Prior Publication Data

US 2014/0360379 A1 Dec. 11, 2014

Related U.S. Application Data

(60) Provisional application No. 61/590,231, filed on Jan. 24, 2012.

(51) Int. Cl.
*A47J 31/36* (2006.01)

(52) U.S. Cl.
CPC ....... *A47J 31/3633* (2013.01); *A47J 31/3609* (2013.01); *A47J 31/3619* (2013.01); *A47J 31/3638* (2013.01)

(58) Field of Classification Search
CPC ................ A47J 31/3609; A47J 31/3614; A47J 31/3619; A47J 31/0647; A47J 31/4482; B30B 1/18; B30B 1/181; B30B 9/3064
(Continued)

(56) References Cited

U.S. PATENT DOCUMENTS 327,297 A * 9/1885 McGovern ............ B30B 9/3064
100/290
3,084,613 A * 4/1963 Maxson .................. A47J 31/40
137/576

(Continued)

FOREIGN PATENT DOCUMENTS

| | | |
|---|---|---|
| CN | 103796561 | 5/2014 |
| EP | 0838186 | 4/1998 |

(Continued)

OTHER PUBLICATIONS

Extended EP Search Report issued in App. No. EP 13743268.8 (dated 2015).

(Continued)

*Primary Examiner* — Ibrahime A Abraham
*Assistant Examiner* — John J Norton
(74) *Attorney, Agent, or Firm* — Barnes & Thornburg LLP

(57) ABSTRACT

An extraction assembly for use in an automatic brewer. The extraction assembly controllably extracts espresso beverage from a quantity of brewing substance. A brew chamber of the extraction assembly is removable for exchange with another brew chamber of different brew volume, having enhanced structures, or for replacement and repair. A heating element may be in close proximity to the brew chamber. Heat from the heating element can be brought directly to the
(Continued)

area in which the coffee is brewed to help maintain a more consistent, tighter tolerance temperature and faster recovery between brew cycles.

19 Claims, 12 Drawing Sheets

(58) Field of Classification Search
USPC ............ 99/323, 297, 302 R, 302 P; 100/290; 173/109, 122, 205, 97, 114
See application file for complete search history.

(56) References Cited

U.S. PATENT DOCUMENTS

| | | | | |
|---|---|---|---|---|
| 3,122,988 | A * | 3/1964 | Rota ........................ | A47J 31/32 137/112 |
| 3,589,272 | A * | 6/1971 | Bouladon .......... | B65D 85/8043 99/295 |
| 3,868,903 | A * | 3/1975 | Montalbano .......... | B30B 9/3017 100/100 |
| 3,910,124 | A * | 10/1975 | Halsey ................... | G01N 23/18 73/601 |
| 5,134,925 | A * | 8/1992 | Bunn ...................... | A47J 31/60 210/499 |
| 5,179,895 | A * | 1/1993 | Bauer ................... | B30B 9/3032 100/193 |
| 5,255,594 | A * | 10/1993 | Grossi ................. | A47J 31/3619 99/287 |
| 5,302,407 | A * | 4/1994 | Vetterli ................... | A47J 31/46 426/433 |
| 5,471,910 | A * | 12/1995 | Sager .................. | A47J 31/3614 99/289 R |
| 5,657,683 | A | 8/1997 | Sandei et al. | |
| 5,823,096 | A * | 10/1998 | Shih .................... | A47J 31/3614 99/302 P |
| 6,339,985 | B1 * | 1/2002 | Whitney ............... | A47J 31/061 99/286 |
| 6,672,200 | B2 | 1/2004 | Duffy et al. | |
| 6,982,063 | B2 * | 1/2006 | Hamel ................. | G01N 35/028 422/511 |
| 7,487,713 | B2 | 2/2009 | Magno | |
| 7,845,270 | B2 | 12/2010 | Rahn et al. | |
| 9,259,115 | B2 | 2/2016 | Radhakrishnan | |
| 2006/0124628 | A1 * | 6/2006 | Long ....................... | A47J 31/20 219/438 |
| 2006/0225576 | A1 | 10/2006 | Hont | |
| 2007/0068393 | A1 | 3/2007 | Nosler et al. | |
| 2008/0264266 | A1 | 10/2008 | Carbonini et al. | |
| 2009/0013874 | A1 | 1/2009 | Wood et al. | |
| 2009/0095165 | A1 | 4/2009 | Nosler et al. | |
| 2009/0293733 | A1 | 12/2009 | Martin et al. | |
| 2010/0024657 | A9 | 2/2010 | Nosler | |
| 2012/0082774 | A1 * | 4/2012 | Staubli ................ | A47J 31/3609 426/431 |
| 2014/0147560 | A1 | 5/2014 | Radhakrishnan et al. | |
| 2016/0157663 | A1 | 6/2016 | Radhakrishnan et al. | |

FOREIGN PATENT DOCUMENTS

| | | |
|---|---|---|
| EP | 1800575 | 6/2007 |
| EP | 2543290 | 1/2013 |
| WO | WO 02/091889 | 11/2002 |
| WO | WO 2010/044116 | 4/2010 |
| WO | WO 2011/0153272 | 12/2011 |
| WO | WO 2011/153272 | 12/2011 |

OTHER PUBLICATIONS

Search Report and Written Opinion issued in App. No. PCT/US2013/022682 (dated 2013).
Office Action issued in Application No. CN201380006474.0 (dated 2017).

* cited by examiner

BREWER

CROSS REFERENCE TO RELATED APPLICATIONS

This application is a U.S. nationalization under 35 U.S.C. § 371 of International Application No. PCT/US2013/022682, filed Jan. 23, 2013, which claims the benefit of priority under 35 U.S.C. § 119(e) to U.S. Provisional Patent Application No. 61/590,231, filed Jan. 24, 2012. The disclosures set forth in the referenced applications are incorporated herein by reference in their entireties.

BACKGROUND

The disclosure relates to beverage brewing systems and in particular brewing systems which use a charge of brewing substance for use in pressurized brewing. Such pressurized brewing is often referred to as “espresso” brewing. Espresso brewing uses a relatively small charge of relatively finely ground coffee or other brewing substance for use in a confined brewing chamber. The brewing substance is compacted to a desired degree and then infused with pressurized water. Compaction of the brewing substance and infusion with the pressurized brewing water requires a sealed brewing chamber to facilitate proper brewing.

The beverage product produced in an espresso brewing process is referred to as “espresso.” Espresso tends to be a thicker beverage compared to drip, French press, cone, or other unpressurized brewing processes. Espresso tends to have a higher percentage of solubles and particulate matter and tends to be relatively viscous or “syrupy.” A variety of espresso brewing machines are available ranging from manual, semi-automatic, to fully automatic. In a manual process an operator grinds a quantity of coffee beans for use in the process. The ground coffee is loaded into a holder device often referred to as a “portafilter.” The portafilter is attached to a pressurized water dispensing head of the brewer. In this manner the ground coffee is contained in a closed, sealed space for brewing. The brewer is activated to controllably deliver pressurized brewing water to the coffee contained in the portafilter. The operator controls the machine for a selected period of time to produce a quantity of espresso beverage.

Fully automatic machines may include a control interface which allows a user to select a type of bean, quantity of espresso to be produced, and perhaps other characteristics. The fully automatic machine includes bean hoppers which may automatically deliver beans to a grinder and then dispense the ground coffee into a brewing chamber. Infusion with heated, pressurized water is automatically controlled by the machine after activation by the operator. At the conclusion of the brewing process a puck of spent, drained but moist, brewing substance is automatically removed from the brewing chamber and passed to a waste collection container for subsequent removal.

In some situations it may be useful to provide an alternative structure for brewing beverage. The alternative structure may be of a larger volume or may include other enhancements. As such it may be desirable to provide a modular assembly which allows the extraction assembly to be removed from one brewer and replaced with a different extraction assembly.

For example, it may be beneficial to initially place a brewer which satisfies various criteria including cost, production volume and reliability. At some point during the life of the system the extraction assembly could be removed and replaced with the extraction assembly which can be mounted in the same position of the machine and coupled to the same water, electrical or other connections. In other words, the new extraction assembly can be substituted for the prior extraction assembly. The prior assembly might be removed for repair purposes, or in order to upgrade the machine.

It may also be desirable to provide a brewer which includes a heating element in close proximity to a chamber which receives grounds for brewing. In this regard, heat can be brought directly to the area in which the coffee is brewed to help maintain a more consistent, tighter tolerance temperature and faster recovery between brew cycles. Temperature affects extraction process and having a preheated brew chamber helps in optimizing extraction process.

Also, it may be desirable to provide various parts that are replaceable, such as wear parts. In this regard, while it is routine to replace items such as gaskets and bushings, it would be desirable to provide a replaceable structure for the brew chamber itself so that the chamber may be removed since it can be a wear part as a result of piston operation against the chamber.

SUMMARY

The present disclosure includes an extraction assembly for use in an automatic espresso brewer. The extraction assembly includes components and methods for controllably extracting espresso beverage from a quantity of brewing substance. The components, assemblies and methods facilitate improved control and operation of the extraction assembly and improve the reliability of the extraction assembly. Generally, the brewing substance is compacted between a pair of opposing pistons. The pair of pistons operates relative to a brew chamber for use in the espresso extraction process. The pistons provide compacting force and boundaries within the chamber and facilitate removal of a spent brewing substance puck at the end of the brewing cycle. An alternative extraction assembly or structure for brewing beverage is provided which may include a larger brew volume, enhanced structures, and removable replacement components. The alternative new extraction assembly can be substituted for the prior extraction assembly. Also provided is a heating element in close proximity to the brew chamber. Heat from the heating element can be brought directly to the area in which the coffee is brewed to help maintain a more consistent, tighter tolerance temperature and faster recovery between brew cycles.

BRIEF DESCRIPTION OF DRAWINGS

The present disclosure will be described hereafter with reference to the attached drawings which are given as a non-limiting example only, in which.

Figure 1:
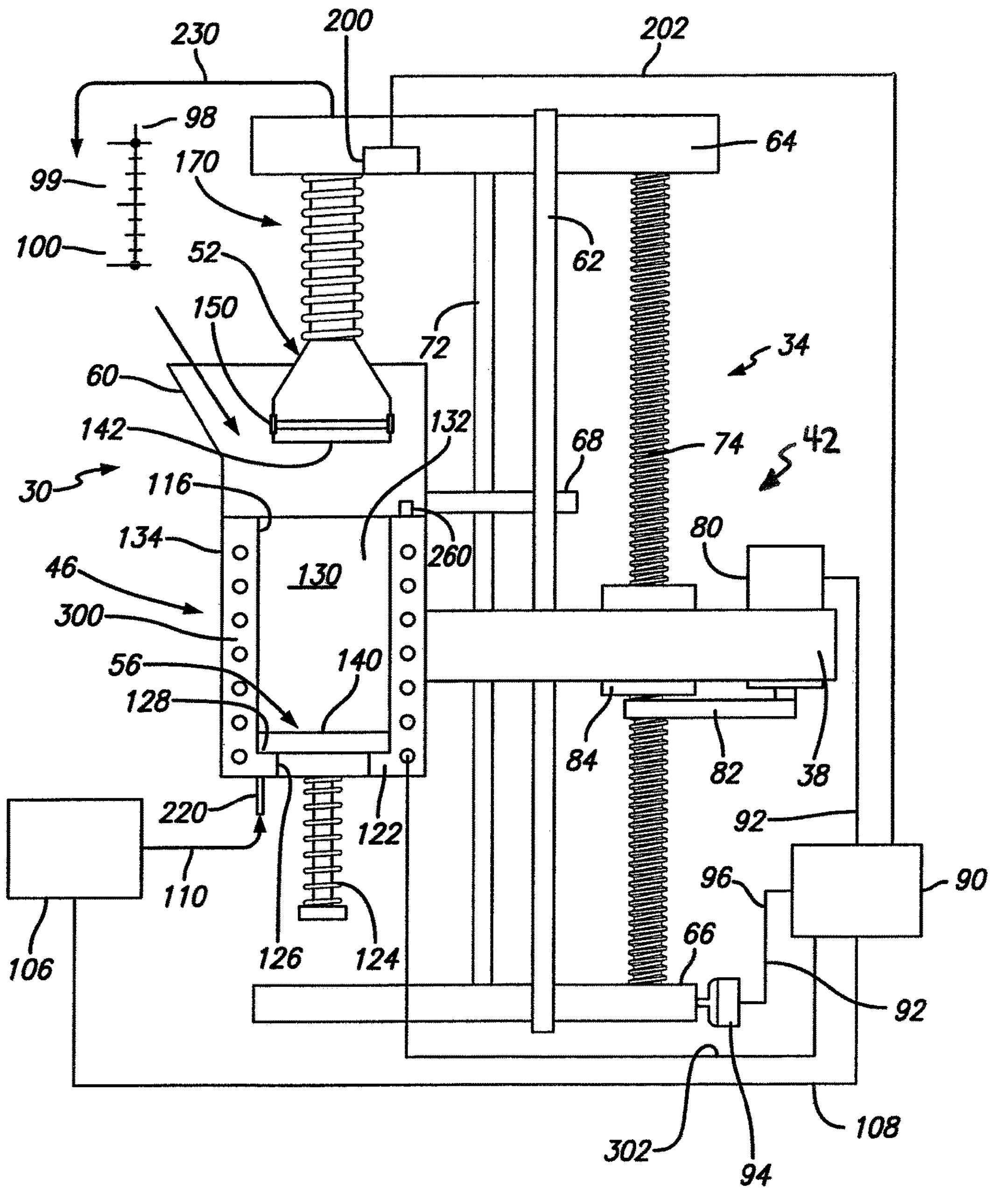
FIG. 1 is general diagrammatic illustration of a extraction assembly of the present disclosure, the extraction assembly including connections to a water delivery system and a controller, the extraction assembly also including a frame on which a carriage is controllably driven by a drive mechanism being carried on the carriage relative to the frame, and a pair of pistons operative and retained relative to the fixed brew chamber for use in compacting brewing substance retained in a cavity of the brewing chamber, introducing water from the heated water system and dispensing an espresso beverage.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

A general diagrammatic illustration of an extractor assembly 30 is shown in FIG. 1. The extractor 30 assembly is used to receive a quantity of brewing substance, contain the brewing substance during a brewing process to extract an espresso beverage, and then dispose of the spent brewing substance. The extractor assembly includes a frame 34 which is controllably movable relative to a generally fixed carriage 38 by drive mechanism 42. A brew chamber 46 is attached to the carriage 38 and are fixed to the housing. The frame 34 by operation of the drive mechanism 42 moves relative to the fixed brew chamber assembly. A first piston 52 and a second piston 56 operate relative to the brew chamber for using during the brewing process. A chute and wiper structure 60 is pivotally attached to the frame so as to travel along with the brew chamber by operation of the drive mechanism 42 on the carriage 38. A cam structure 62 is attached to the frame 34 at an upper beam 64 and a lower beam 66. A cam follower 68 on the chute/wiper 60 is engaged with a cam slot 70 in the cam structure 62 (see FIG. 2).

The frame 34 includes the upper and lower beams 64, 66 and a column 72. A lead screw 74 of the drive mechanism 42 is attached to the upper and lower beams 64, 66. While the lead screw 74 may be more appropriately defined as part of the drive mechanism, it also provides a structural component and is attached to other components of the frame 34.

The drive mechanism 42 includes the lead screw 74 and a controllable drive motor 80. The drive motor is mechanically coupled by way of a transfer assembly 82 such as a pulley and belt combination. Operation of the motor 80 and the transfer assembly 82 operates a correspondingly attached to the drive interface 84. The drive interface 84 is driven by the transfer assembly 82 and is provided with threads which correspond to the thread structure of the lead screw 74. Transfer of energy from the motor 80 to the drive interface 84 causes relative motion of the frame 34 to which the drive mechanism 42 is attached along the lead screw 74.

A controller 90 is coupled to the drive motor 80 over line 92. A limit detector 94 in the form of a limit switch or other switch device positioned proximate a portion of the movable frame such as a detection plate 95 is coupled to the controller 90 over line 96. The limit switch detects an upper limit 98. Such limits may be in the form of structural features such as bumps or the protrusions or may be indicia 99, gaps, colors, or magnetic strips or other devices which can be used to detect various limits, the sensor 94 along with the flow meter helps in detecting the lower limit 100 of the frame travel. The combination of the limits switch 94 and the sensor and flow meter detecting the upper and lower limits 98, 100 is intended to be broadly interpreted. These limits provide upper and lower boundaries which will be detected and communicated to the controller 90 to limit travel of the movable frame 34 and corresponding components upwardly and downwardly relative to the carriage and the adjustment screw driving therethrough. The location of the limit switch 94 may be varied for the best results.

A heated water system 106 controllably provides heated water to the extraction assembly 30. The heated water system is controlled, at least in part by being coupled to the controller 90 over line 108. The heated water system 106 is generally known in the art and may provide a variety of controllable features to control the amount of water dispensed, the timing of water dispensing, the temperature of water dispensed, the pressure of the water dispensed, and other features. A dispense line 110 is coupled to and communicates with the heated water system 106 to deliver water from the heated water system 106 to the brew chamber 46.

It should be noted that the present disclosure may refer to coffee an espresso in reference to beverage making substance throughout the description in the interest of clarity and simplicity. It will be understood, however, that any form of beverage making substance may be used to produce a beverage and the term coffee or beverage making substance is intended to be broadly interpreted. This broad interpretation is also intended to include, but is not limited to, beverage substances including but not limited to, coffee, tea, herbs, botanicals, liquid beverage concentrate, ground, pulverized, rough cut, whole, powdered beverage concentrate, flaked, granular, freeze dried or other forms of materials including, but not limited to, liquid, gel, crystal or obtain a beverage or other food product or any other forms of beverage substance or food products.

Terms including beverage, brewed, brewing, brewing substance, brewed liquid, and brewed beverage as may be used herein are intended to be broadly defined as including, but not limited to, the brewing of coffee, tea, and any other beverages. This broad interpretation is also intended to include, but is not limited to, any process of dispensing, infusing, steeping, aerating, reconstituting, diluting, dissolving, saturating or passing a liquid through or otherwise mixing or combining a beverage substance with a liquid such as water without limitation to the temperature of such liquid unless specified. While a heated liquid is referred to herein it should be understood that reference to temperature is provided by way of illustration and not limitation and should be broadly interpreted. It should be understood that a beverage may be made to accommodate a recipe using heated, unheated, chilled or liquid within any range of temperature. Also, the volume or quantity of the beverage making substance used in the system or the beverage produced by the system is intended to be broadly interpreted and not limited to that as specifically disclosed and includes serving sizes ranging from single cup to multiple cup containers or low volume shots.

Figure 2:
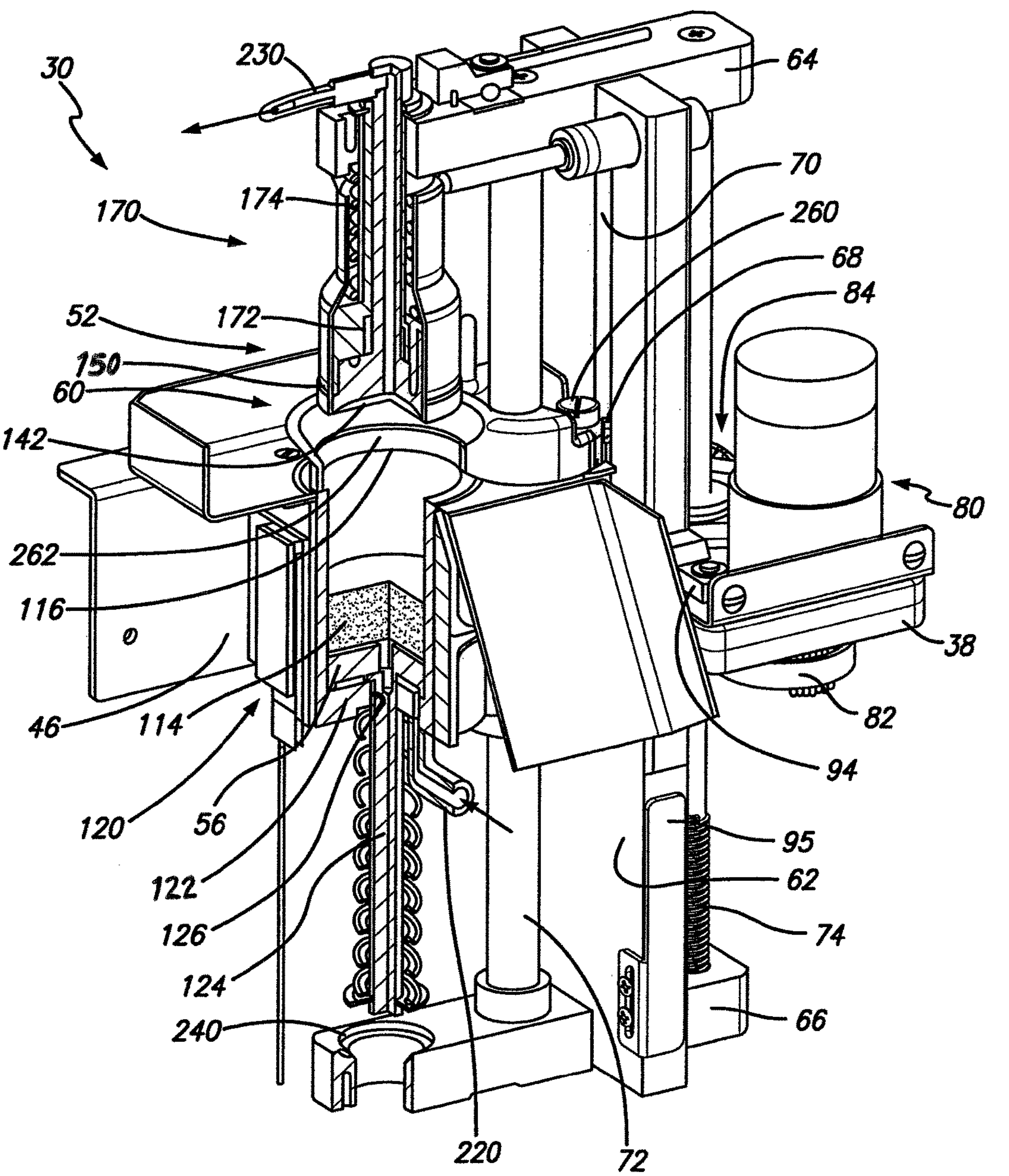
FIG. 2 is a diagrammatic illustration similar to that as shown in FIG. 1 in which the extraction assembly is shown in a perspective view, illustrating and describing the structures and functions of the extraction assembly, the extraction assembly being positioned to receive a beverage brewing substance which has been dispensed into the cavity of the brew chamber for use in a brewing process.

With further reference to FIGS. 2, 3, 5 and 8, a variety of operating positions and conditions for the extraction assembly 30 are shown. In FIG. 2, the extraction assembly 30 is positioned for receiving a quantity of brewing substance 114. As shown in FIG. 2, the brewing substance has been dispensed from a grinder through the conical chute 60 and through a mouth 116 of the brew chamber 46. As shown, the first piston 52 is positioned outside of the brew chamber so as to prevent interference when dispensing ground coffee through the chute 60 and into the brew chamber 46. The position also may assist in preventing accumulation of ground coffee on the first piston 52.

As shown, the second piston 56 is positioned in a lower portion 120 of the brew chamber. A shoulder 122 is positioned on the lower portion 120 of the brew chamber so as to provide an interface between the second piston 56 to limit travel of the piston downwardly through the brew chamber. A stem 124 of the second piston extends downwardly through an opening 126 in the bottom of the brew chamber defined by the shoulder 122. A sealing gasket 128 is provided between the shoulder and piston so as to prevent leakage there between. Beverage brewing substance 114 dispensed into a cavity 130 defined by the inside surface 132 of the walls 134 of the chamber 46 rests on the upper face 140 of the second piston 56. In the position shown in FIG. 2, the frame 34 is in grinding position allowing transfer of grounds to the brew chamber 46. In one embodiment the motor 80 is a controllable DC drive motor which can be controllably operated on, off, or at a variety of intermediate speeds. When not operated, the frame 34 ceases movement along the lead screw 74 and sits idle unless operated by the controller 90.

Figure 3:
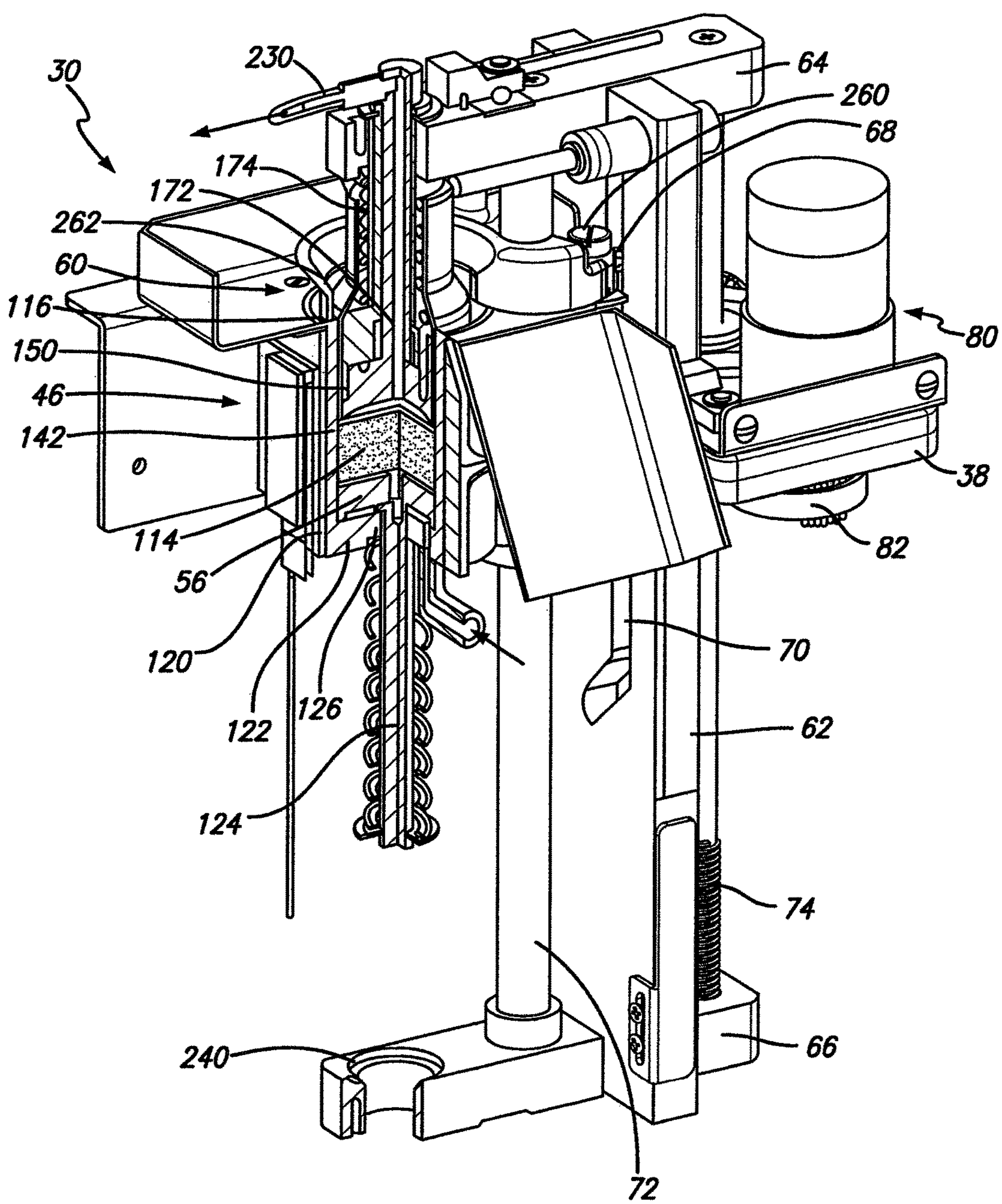
FIG. 3 is the extraction assembly as shown in FIG. 2 in which a first piston has been engaged by movement of the pistons resulting in retaining and compacting brewing substance between the first piston and a second piston, a first and second spring associated with the first piston providing relative spring force to facilitate compaction of brewing substance and at least one sensor carried on the extraction assembly providing compaction information to the controller.

Progressing to FIG. 3, the drive mechanism 42 is operated to move the frame 34 carried on the lead screw downwardly along the brew chamber 46 so that the first piston 52 is engaged in the cylindrical cavity 30 of the chamber 46. Engagement of the face 142 of the first piston 52 against the brewing substance increases the compacting force applied to the brewing substance 114 in the cavity 130. It should be noted that the second piston 56 is carried against the shoulder 122 upwardly in a stationary dead stop position. As such, compaction force is driven against the second piston providing sealing of the second piston against the shoulder.

Figure 4:
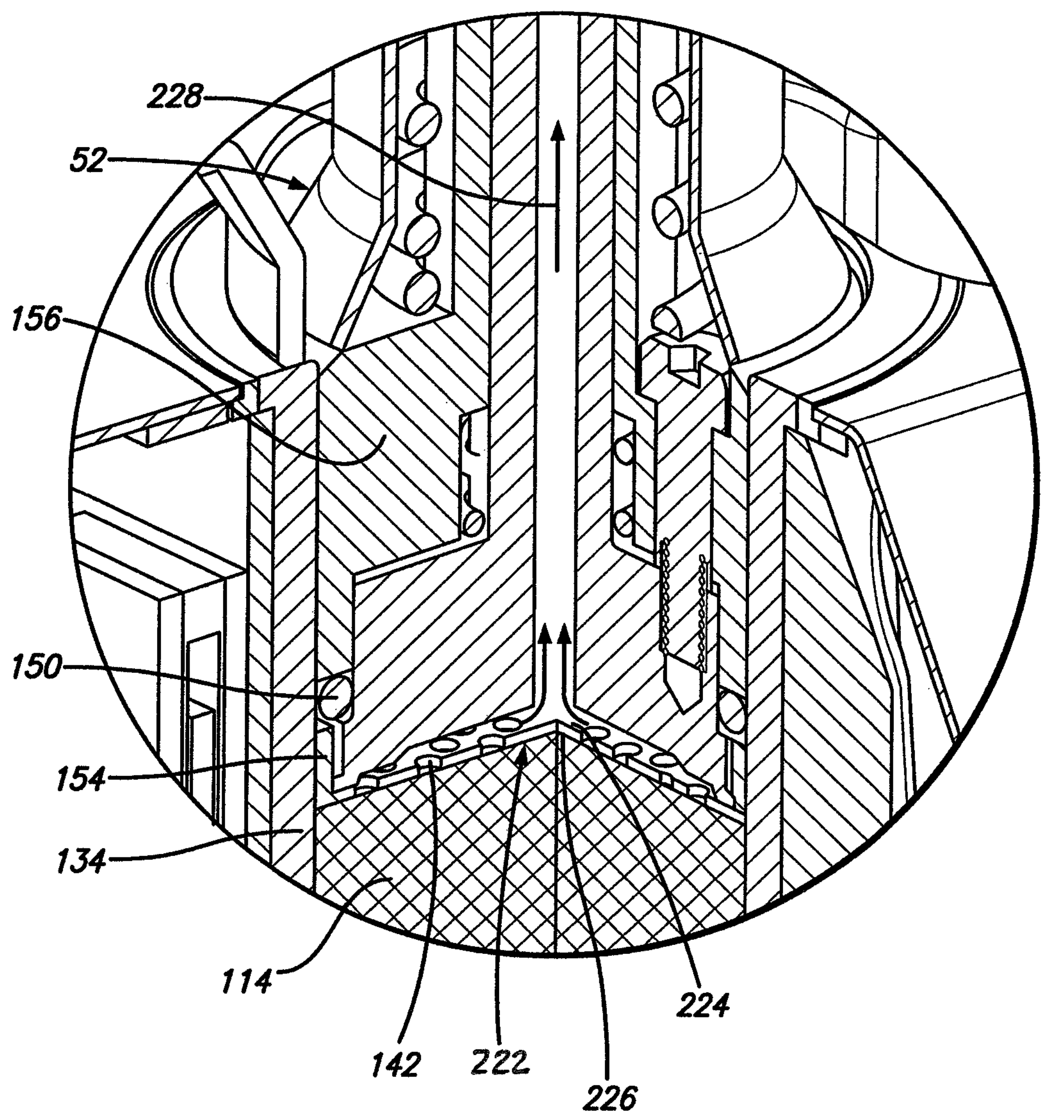
FIG. 4 is an enlarged partial fragmentary view of a compressible gasket used in the extraction assembly and a corresponding filter and drain passage associated with the first piston; to prolong the life of the gasket seal, the compression for sealing occurs only when the compacting force is applied. The gasket seal otherwise rides freely on the inner surface of the brew chamber avoiding abrasion and friction.

With reference to FIGS. 1 and 4, a sealing structure such as a compressible gasket, o-ring or other device 150 is carried in a perimeter annular channel formed on an outside perimeter of the first piston 52. The gasket 150 is made of a compressible material. A leading edge 154 carried on the piston 152 is movable relative to a sleeve 156 carried on the outside of the piston. Compaction of the brewing substance 114 by the face of the piston 142 causes relative motion of the leading edge 54 against the sleeve 156. This relative motion causes compression of the gasket 150 in the annual grove there between.

Compression of the gasket 150 does not occur during the initial movement of the piston 52 into the chamber 46 helping to reduce wear on the gasket and prolong its life. In this regard, a pair of first and second springs 174 and 172 are carried on a shaft 170 of the piston. When the piston 52 is first introduced into the brew chamber by movement of the frame 34, the springs 174, 172 are relaxed and not compressed. As such, there is generally nominal force of the first spring 174 against the sleeve 156. As such, there is little if any compression of the gasket 150 outwardly from the annular channel 152. There is nominal engagement between the gasket 150 and the inside surface 132 of the walls 134 of the brew chamber. This facilitates improved wear characteristics and operation of the extraction assembly. While there may be some engagement between the gasket 150 and the inside surface 132 of the cavity 130, this merely provides a wiping function which may provide improved sealing when the gasket 150 is compressed.

Further movement of the carriage upwardly causes the slight compression of the second spring 172, having a lower spring constant, to initially start to compress as the face 142 of the piston contact the brewing substance. This tends to create a "soft seal" slightly compressing the o-ring. This results in an initial compaction force or packing pressure on the brewing substance. This soft seal and initial packing pressure allows the grains in the ground brewing substance to shift and position to provide some degree of uniformity in the distribution and compaction of the brewing substance.

Continued movement of the frame down along the lead screw causes further compaction and compression of the first spring 174. Compression of the first spring 174 creates forces against the sleeve which further compresses the gasket 150 which causes the gasket to bulge outwardly against the inside surface of the brew chamber and creates a tighter seal. A packing pressure of approximately 40-50 pounds may be used for the compaction of the brewing substance 114. The spring constant associated with each of the two springs 174, 172 can be specified so that desired compaction force against the brewing substance is achieved. Once the frame 34 is moved downwardly to fully engage the first piston 52 to a predetermined packing pressure, water can be dispensed in to the chamber under pressure to start the extraction process.

A sensor or detector 200 is provided on the extraction assembly to detect the conditions of the assembly during the brewing process. In this regard, the sensor 200 can be used to detect a variety of conditions associated with the compaction process just described. The sensor can be provided in a variety of embodiments such as optical, physical pressure detecting, relative movement, proximity, or other types of detectors. Also, the sensor may be positioned in one of several positions or multiple sensors may be used to provide difference sensing parameters or multiple sensing parameters to provide redundancy.

As shown in the Figures, a proximity detector 200 is carried on the frame. The proximity detector detects the relative motion of the first piston 52. The proximity detector is coupled to the controller over line 202. Once a predetermined condition is achieved, the proximity detector 200 detects this condition and communicates the information to the controller. The controller then stops further operation of the drive motor 80 thereby stopping movement of the carriage 38. Ceasing operation of the motor 80 ceases movement of the frame 34 thereby creating a stopped or parked condition. The stopped position of the frame provides a relatively stable position for the brewing process. The sensor 200 (or multiple sensors) may be used to continue to monitor the condition throughout the brewing process. In this regard, if brewing substance shifts during the brewing process the change in compacting force can be detected and the motor 80 can be operated to adjust the frame appropriately. Continued monitoring may be used to improve the quality and continuity of the brewing process including the potential for shifting or change of the brewing substance or other brewing conditions.

Once the brewing substance 114 appropriately compacted in the brew chamber 46 between the first and second pistons heated water can be introduced through the inlet lines 220. Heated water enters through the second piston 56. A filter structure 222 (see FIG. 4) carried on the first piston 52 allows beverage to pass through openings in the filter 224 and flow through the drain path 226. Espresso 228 flowing through the drain path is moved upwardly through the first piston 52 and out through the dispensing line 230. The espresso brewing process operates using pressurized water from the heated water system 106. Generally, the pressure is sufficient to drive the espresso beverage upwardly through the drain path 226.

The flow meter count is monitored to determine the end of the brew cycle. This signal of the brew cycle completion allows the frame to change direction of movement along the lead screw 74. As the frame 34 moves upwardly, the reverse of the compaction cycle occurs with regard to the first piston 52. The pressure is relieved from the springs 174, 172 ultimately allowing decompression of the gasket 150. The decompressed gasket allows the first piston to smoothly disengage from the inside surface 132 of the brew chamber.

Figure 5:
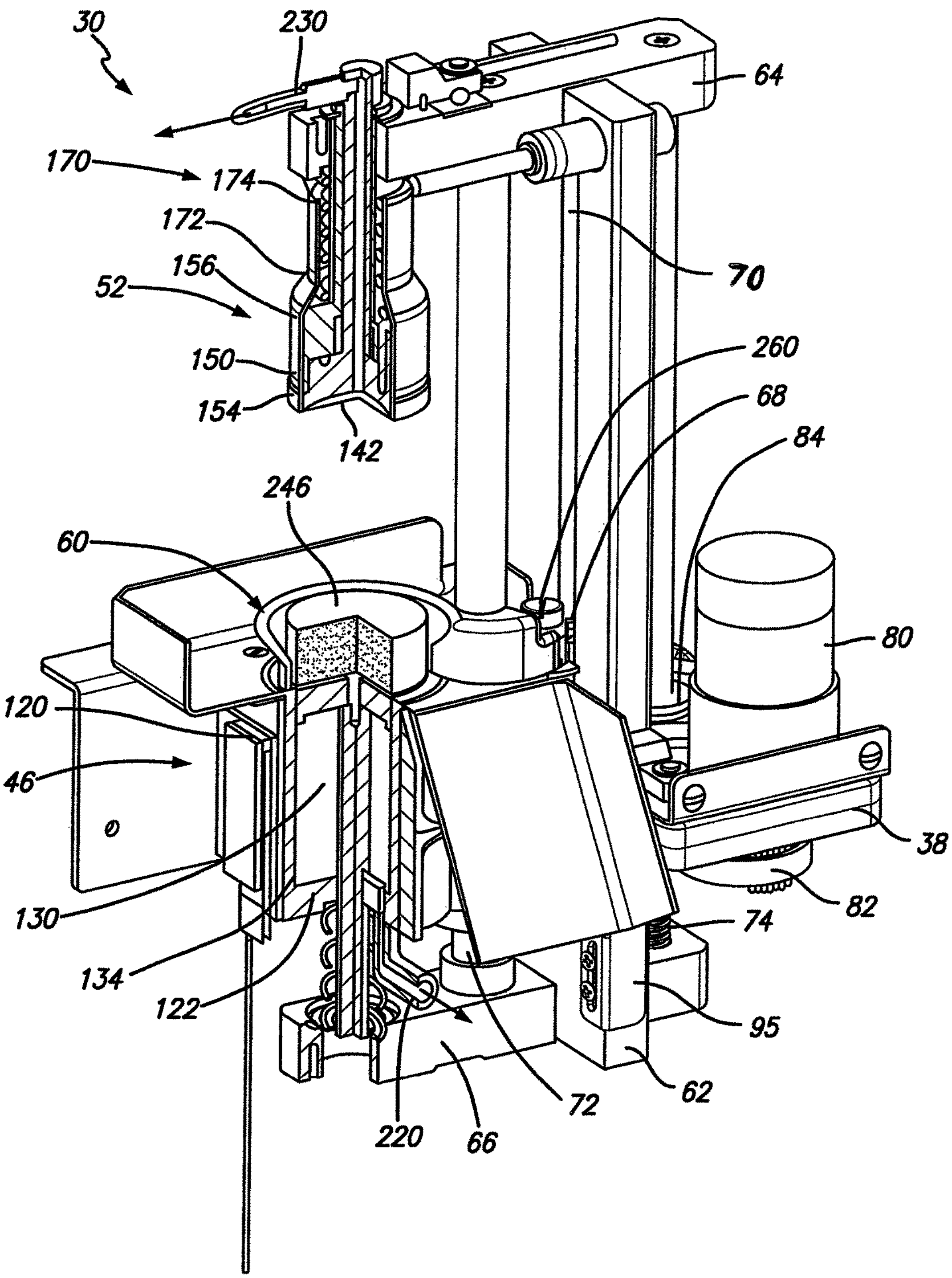
FIG. 5 shows the extraction assembly after a brewing operation in which the first piston has been displaced upwardly causing a portion of the second piston carried in the brew chamber to be displaced upwardly after contacting a lower portion of the frame, the brew chamber being positioned stationary while the first piston continues to move relative to the second piston causing a puck of spent brewing substance to be positioned relative to the upper mouth of the brew chamber for removal therefrom.
Figure 6:
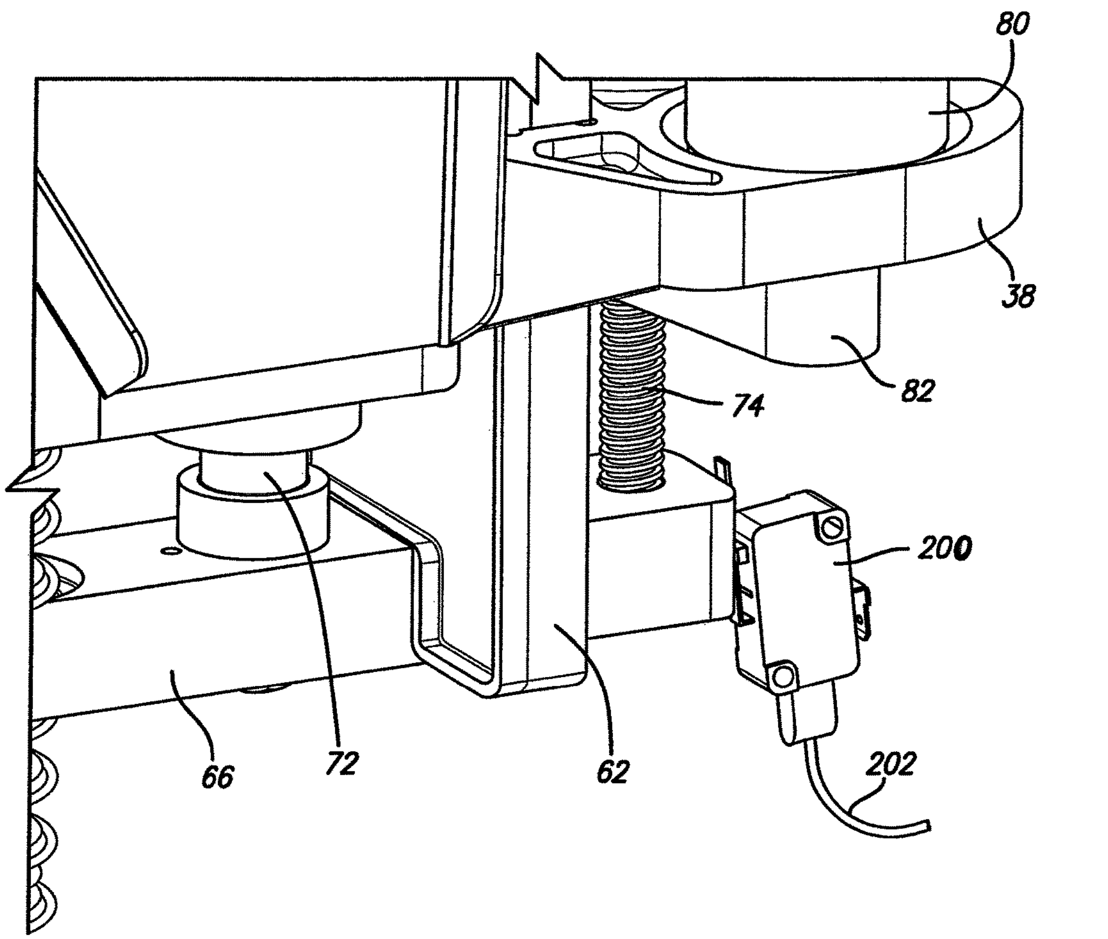
FIG. 6 is an enlarged, partial fragmentary cross sectional view of a portion of a cam structure which is attached at upper and lower portions of the frame and is generally parallelly aligned with an adjustment screw of the assembly.

As the frame progressively moves downwardly, the stem 124 of the second piston 56 disengages the lower beam 66 of the frame 34. As the frame continues to travel upwardly, the shaft 124 bottoms out against the recess 240 causing the piston head to disengage from the shoulder 122. Further upward movement of the frame 34 causes relative motion of the piston 56 in the cavity 130 to move the spent brewing substance or "puck" 246 upwardly towards the mouth 116 of the chamber 46. The puck in this condition is a somewhat moist relatively drained form of brewing substance. Some moisture allows the puck of material to retain the puck-like shape which facilitates convenience handling. As shown in FIG. 5, the piston 56 has been moved to a position generally co-planar with the mouth 116 of the chamber 46.

Figure 7:
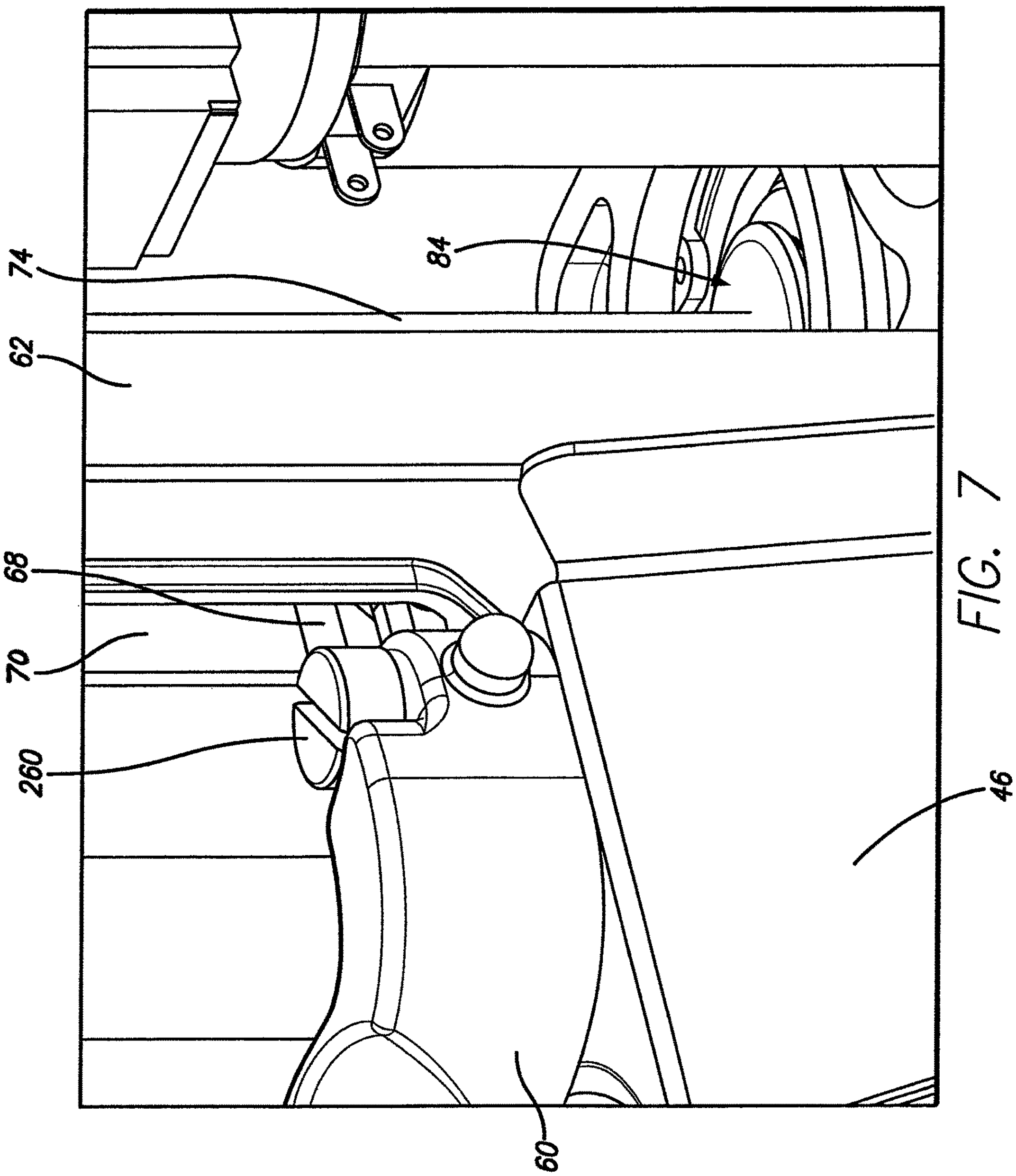
FIG. 7 is an enlarged, partial fragmentary view of a portion of the cam structure taken from FIG. 5 showing a cam follower positioned in a cam slot for coordinating movement of the chute and wiper structure relative to the brew chamber, the chute facilitating dispensing of ground brewing substance into the cavity of the brew chamber at the start of the brewing process and the wiper facilitating removal of the puck from the chamber and second piston at the end of the brewing process by operation of the cam follower in the cam slot.
Figure 8:
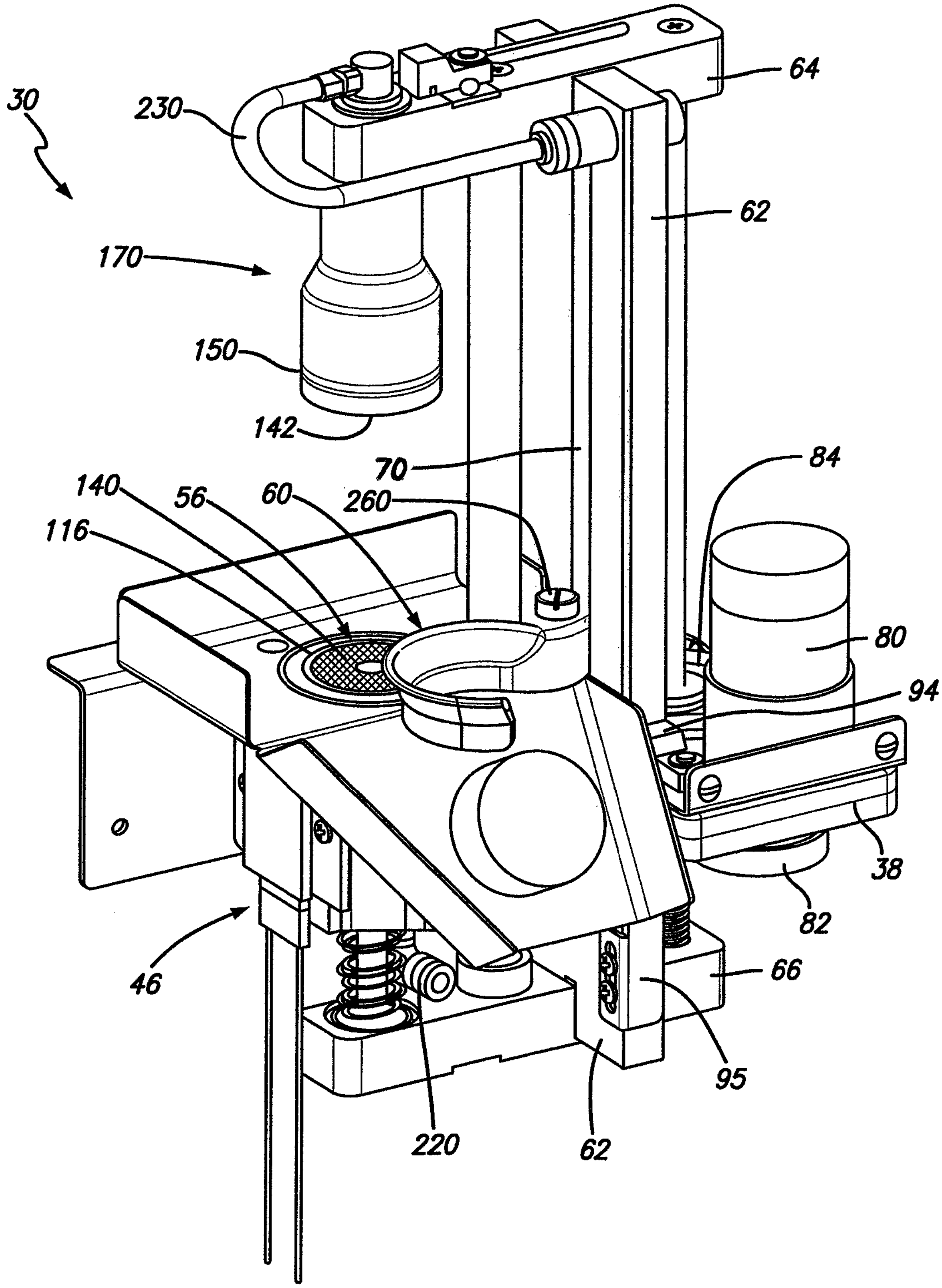
FIG. 8 is an extraction assembly as shown in the prior figures in which the cam follower acting along the cam slot operates to pivot a wiper relative to the brew chamber to displace a puck of brewing substance away from the chamber for disposal, the attached chute helps transferring the used puck of brewing substance to the disposal bin.

At this point, reference is made to the enlarged view of FIG. 7 as taken from FIG. 5. FIG. 7 shows the cam follower 68 in the cam slot 70 which has generally followed a straight line path downwardly along the cam plate 62 from a position as previously shown in FIG. 3. At this point, the cam follower travels along an angled portion of the slot causing the chute/wiper 60 to which the cam follower 68 is attached to pivot about the pivot point 260. Pivoting of this structure 60 causes a blade portion 262 to sweep across the face 140 of the second piston 56 thereby ejecting or disposing of the puck 246. Blade 262 also tends to wipe or remove material from the face 140, thereby further enhancing the cleaning aspect of the present extractor assembly 30. After the puck 246 is ejected, the frame 34 is driven by the motor 80 upwardly to a position as shown in FIG. 2 which readies the assembly for the next brew cycle.

In use, the extraction assembly 30 starts as shown in a position in FIG. 2 to receive brewing substance 114. The frame 34 driven by the drive mechanism 42 travels downwardly along the lead screw 74 so that the first piston 52 engages and starts to compact the brewing substance 114 against the second piston 56. As described, multiple springs 174, 172 are provided and associated with the first piston 52 to provide a seal by slightly compressing the gasket 150 between the sleeve and piston's head. The compression of the gasket 150 causes it to bulge slightly outwardly to form a tighter seal between the compressed gasket and the inside surface 132 of the chamber.

At a predetermined level of compaction force, the sensor 200 communicates with the controller 90 to stop operation of the motor 80 thereby stopping movement and compression or compaction of the brewing substance 114. After the sensor indicates that the compaction is at a predetermined level and movement of the frame 34 should stop, the heated water system 106 is controlled to dispense water through line 110 to the chamber 46.

As an additional matter, the chamber 46 can be provided with a heating element 300 which can be coupled to the controller 90 over line 302. The heating element 300 can be wrapped on the outside of the chamber, embedded in the chamber or otherwise associated with the chamber so as to provide controllable heating energy if needed to the material of the chamber wall 134. The ability to provide controlled heat to the chamber helps to maintain the temperature of the brewing process and prevent dissipation of the heat from the heated water. Controlled heating may be useful to help maintain a predetermined preferred brewing temperature. If the characteristics of chamber 46 are such that heat energy in the water would transfer to the wall material 134, it may reduce the temperature of the water to an undesired level thereby altering the expected brewing characteristics. As a result, additional heat can be controllably provided to maintain the chamber wall 134 at a desired temperature to prevent this heat transfer.

As the water flows through line 110 into the cavity 130 filled by the compressed brewing substance 114, a brewing process occurs often referred to as "espresso brewing". The espresso beverage is filtered through the filter structure carried on the first piston 52 and flows through the drain passages for dispensing from the dispense line 230.

Figure 9:
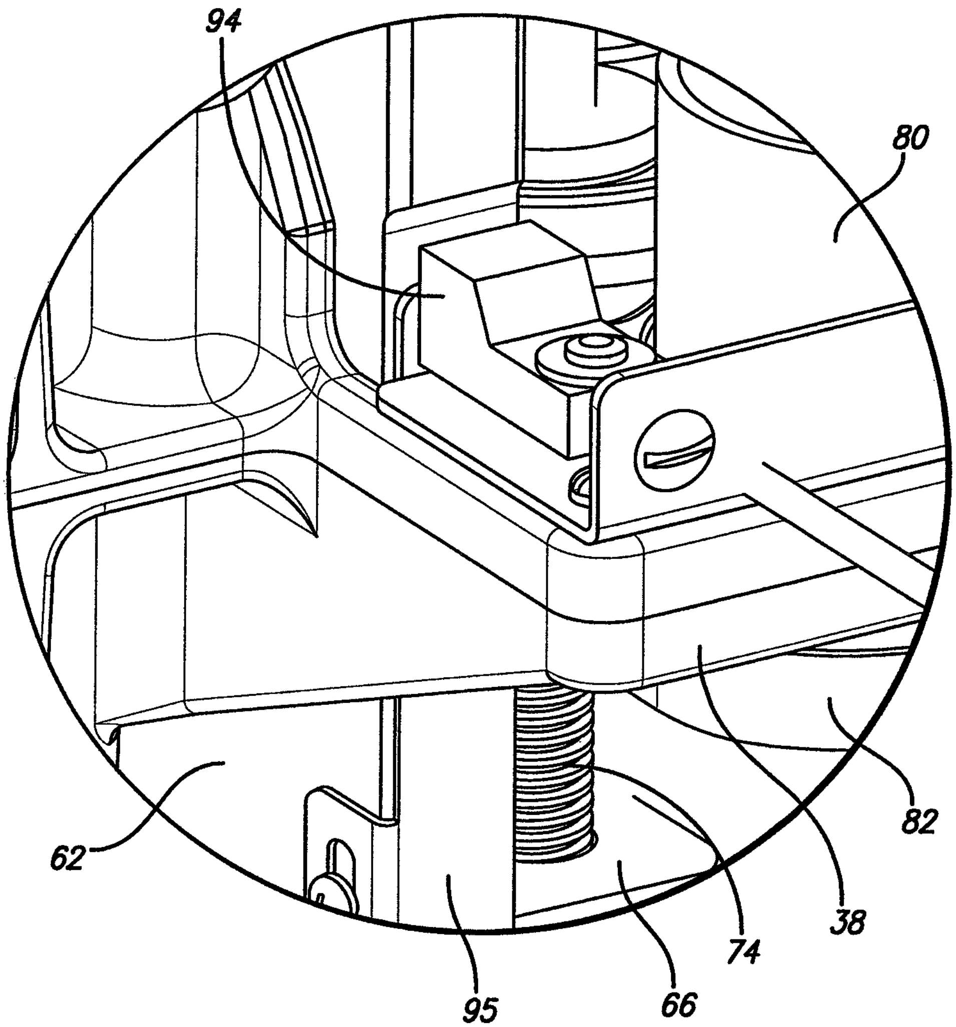
FIG. 9 is an enlarged partial fragmentary view of the limit detector detecting the limits of movement of the carriage relative to the brew chamber, which would limit the upward travel of the brew chamber to a position approximately as shown in FIG. 2, the compacting force sensor and the flow meter works in combination as a limit detector detecting the travel limit of movement of the carriage relative to the brew chamber to a position approximately as shown in FIG. 3.

In the upwardly most or "home position", a limit switch or sensor 94 operates (see FIG. 9) to prevent over travel of the frame throughout the brewing process. In the downwardly most or brewing position, the compacting sensor, and flow meter signals prevents over travel of the frame throughout the brewing process.

Figure 10:
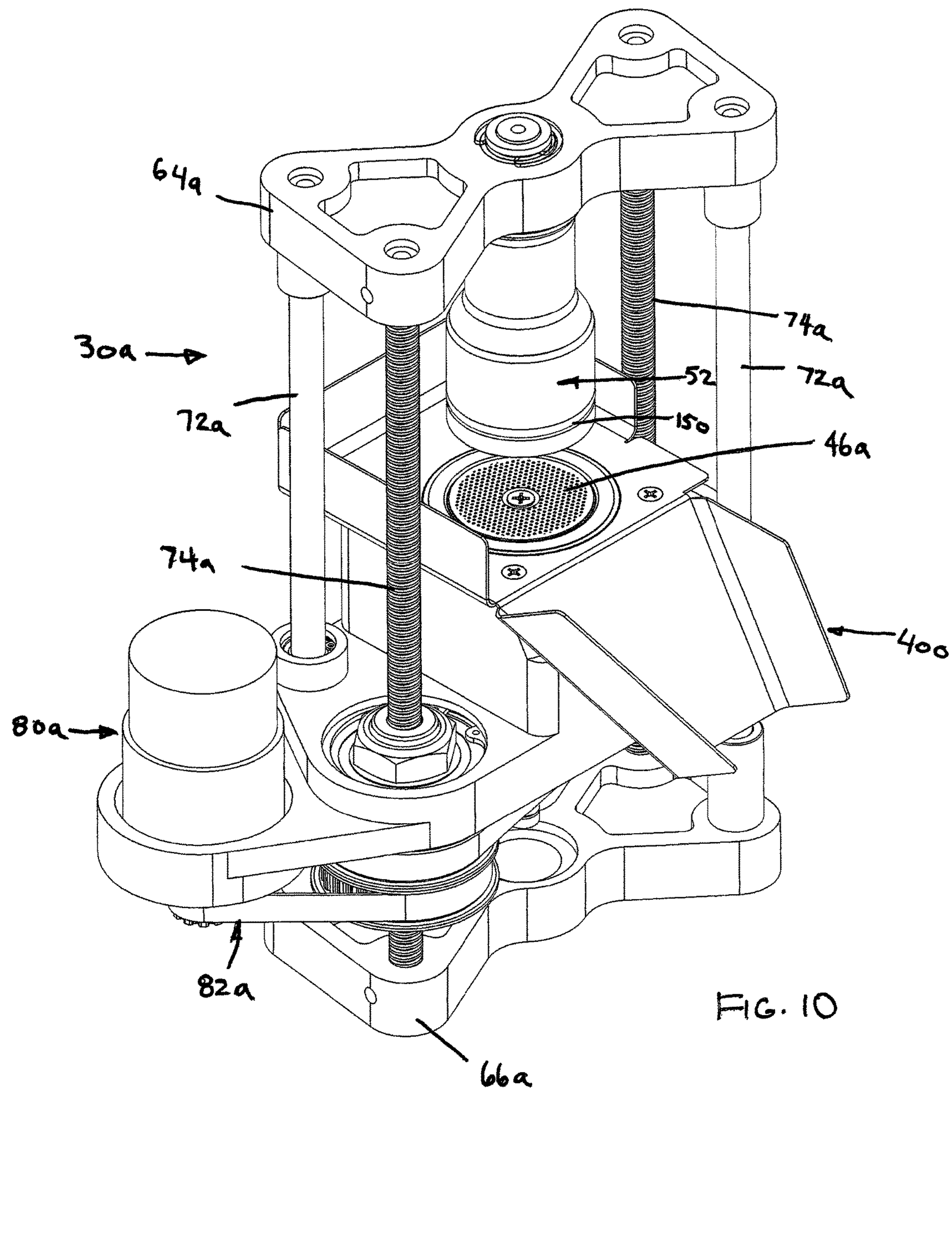
FIG. 10 is a view of an alternate embodiment of the extraction assembly which can be provided with a brewing system or retrofitted into an existing system, the extraction assembly can be substituted for the form of the extraction assembly found in FIGS. 1-4 as a replacement and enhancement, the alternate embodiment for the extract assembly providing a larger volume chamber to facilitate brewing larger quantities of beverage, also provided with the larger volume brew chamber may be instillation of one or more heating components as well as additional columns and lead screws to enhance the mechanics of the higher volume brew chamber and extraction assembly.
Figure 11:
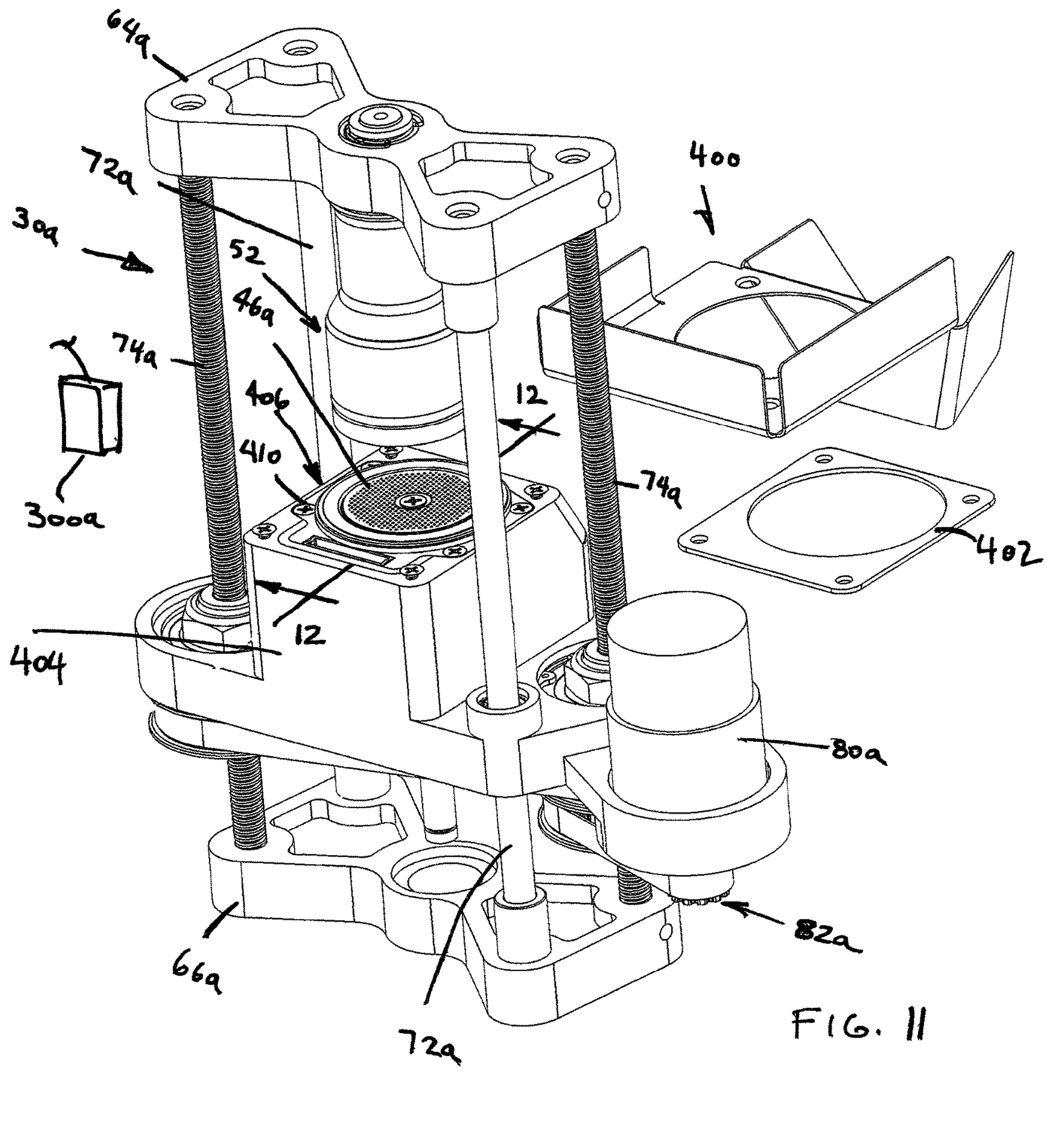
FIG. 11 is a view similar to that as shown in FIG. 10 from the reverse prospective view with the grounds retaining structure and puck slide removed to show placement of insulating materials and a heating device.
Figure 12:
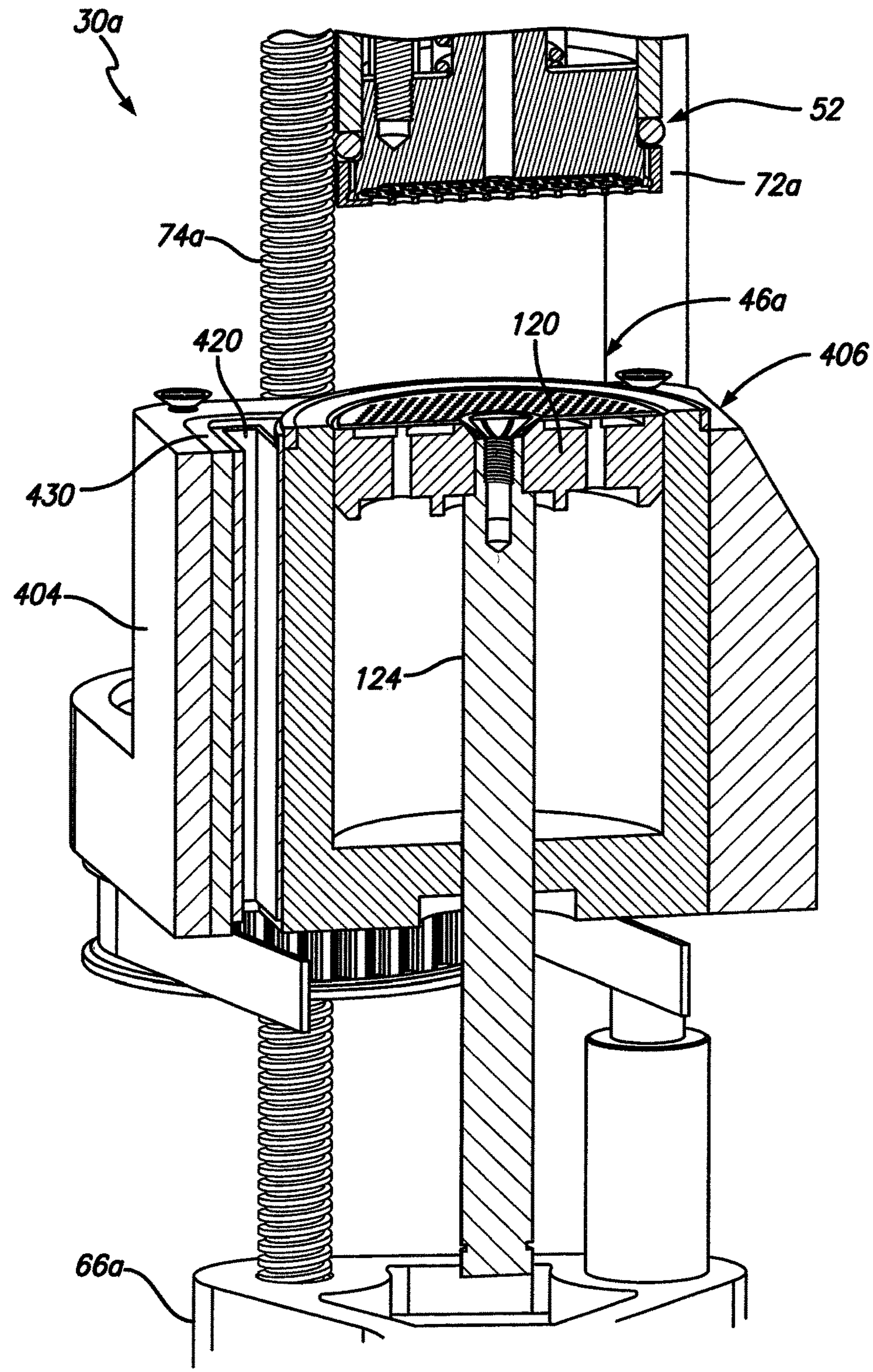
FIG. 12 is a partial fragmentary cross sectional perspective view taken along line 12-12 in FIG. 11 showing a sleeve provided for installation of a localized heating device coupled to the brewed chamber for helping to maintain a more consistent, tighter tolerance temperature, and faster recovery between brew cycles, and also prevent heat loss of the hot water dispensed into the brew chamber for the brewing process.

The alternate embodiments shown in FIGS. 10-11 and 12 build upon all the details of the disclosure provided here and above. Moreover, the embodiments shown in FIGS. 10-12 incorporate all of the structures and operating mechanisms as described in relations to FIGS. 1-9 as well as additional enhancements as will be described.

The extractor assembly 30*a* as shown in FIG. 10 is similar to that as shown in FIGS. 1-9 and will use the same reference numerals to the extent practical with the addition of an alphabetic suffix "a" next to the reference numeral to designate the alternate embodiments. As shown in FIGS. 10 and 11, the carriage 30*a* is enhanced since it accommodates a larger brew chamber 46*a*. The enhanced carriage 38*a* is provided to accommodate multiple lead screws 74*a* and columns 72*a*. The enhanced structures provide stability when brewing using the larger volume brew chamber 46*a*. The larger volume brew chamber 46*a* is used in the operation of the system in the same manner as described in FIGS. 1-9 above but may produce additional structural forces when compacting coffee in the brew chamber due to the larger dimensions, surface area, volume of coffee and compacting forces.

As and additional benefit of the enhanced brewing chamber structures, the combined structures reduce the overall stress on each individual structure thereby enhancing the reliability and life of the structure. Additional torque may be applied to the enhanced structure which allows for more precise tuning of the compacting forces applied by the pistons in the brew chamber. As noted above, the use of multiple shafts and lead screws reduces deflection of the structure by more evenly distributing the forces and providing enhanced balance to the overall structure. The more equally distributed forces also provides an opportunity to prolong the life of the motors, actuators, bearings, belts, bushings and other components associated with the drive system. Additionally, the distributed forces and lead screw operations helps to more precisely align the piston as it travels through the chamber resulting in further piston and chamber life.

FIGS. 10 and 11 show the use of the multiple lead screws 74*a* and columns 72*a* to prevent deflection of the system when additional forces are placed on the enlarged piston driving into the enlarged chamber. A separate arm similar to that as shown in FIG. 2 is provided to sweep the spent puck of grounds off of the surface of the chamber area at the completion of a brewing cycle. In the present embodiment the sweeper is powered by a linear actuator instead of the cam operated system as shown in FIGS. 1-9. The use of a separate linear actuator to drive the sweeper arm eliminates the need to provide a cam driven link between the arm and the brewer structure. Elimination of the cam drive may reduce the forces on the structure and provides improved independent control of the sweeper arm. In some applications the use of a separate linear actuator may be beneficial so as to reduce the overall vertical dimension of the assembly.

It should be noted that the overall construction and arrangement of the enlarged brew chamber version as shown in FIGS. 10-12 can be retrofitted or directly substituted for the structure as shown in FIGS. 1-9. In this regard, all of the same operating connections and systems can be connected to the same controller, waterlines, power lines and other systems. The controlling software would need to be loaded to accommodate the operating characteristics associated with the higher volume brew chamber and associated operating and control parameters. Nevertheless, the system is designed to mate with the mounting connections used in the current platform thereby allowing a purchaser of the original equipment to upgrade to a different, higher volume system if desired in the future.

With further reference to FIGS. 11 and 12, a shield and chute assembly 400 and the associated gasket 402 have been removed from the top of the brew block 404. This reveals a removable and replaceable brew chamber 406. The brew chamber is a sub assembly which fits into the block 404 and is retained by fasteners 410. If the brew chamber because worn, it can be removed and replaced while retaining all of the other surrounding components. This can be accomplished with a relatively straight forward onsite maintenance activity allowing an operator to maintain high quality brewed beverages precisely and reliably produced as a result of high level preventative maintenance.

As further shown in FIG. 11 and the cross sectional view of FIG. 12 which is taken along the line of 12-12 in FIG. 11, the removable brew chamber 406 also includes a sleeve 420 for receipt of a heating component 300*a*. The heating component 300*a* can be replaced with the replaceable brew chamber assembly 406 or it can be removed from the worn brew chamber assembly 406 and replaced in the new brew chamber assembly. This ability to remove and configure components as necessary helps to further increase the life of the components and reduce the overall cost. For example, while a brew chamber may become worn overtime after numerous brewing cycles, the heating component 300*a* retained in the sleeve 420 might not be subject to wear as it is an electrical component.

Further, an insulating structure 430 is retained around the sleeve 420 to enhance the use of heat energy created by the heating element to direct it towards the brew chamber. This further enhances the heating efficiency of this system and helps maintain a consistent temperature of the brew chamber throughout numerous brewing cycles.

The heating component is provided in the preferred embodiment in the form of a positive thermal coefficient ceramic heater or PTC heater. The PTC element is useful since it has a generally highly nonlinear thermal response and becomes resistant above a threshold temperature which depends on the composition of the materials in the PTC heater. The PTC element does not require a thermostat because it effectively is self regulating due to the described properties. The PTC component provides more reliably controlled heating to the chamber.

Localized heating of the brew area rather than heating the entire block helps to reduce the energy of keeping the brew chamber at a predetermined temperature. Further, this localized heating also prevents overheating of the other components in the system such as the, puck removing arm. Moreover, when the brewer is in a start up mode it takes less time for the heating element which is placed in close proximity to the brew chamber to bring the brew chamber up to a predetermined brewing temperature than if the entire block needs to be heated. As a result of providing a removable heating component 300*a* in the sleeve 420 the component 300*a* can be removed to help reduce the temperature of the block more quickly when servicing the brewer.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage extraction assembly comprising:
- a frame having at least two spaced apart lead screws and at least two spaced apart columns;
- a drive mechanism coupled to the lead screws;
- a carriage coupled to the drive mechanism for movement with the drive mechanism relative to the frame and coupled to the columns;
- a brew chamber coupled to the carriage for movement with the carriage relative to the frame, the brew chamber configured to receive a brewing substance for forming a brewed beverage when combined with water, the brew chamber positioned between the lead screws and between the columns;
- a water system coupled to the brew chamber and configured to deliver water to the brew chamber;
- a first piston coupled to the frame and sized to be at least partially received in the brew chamber; and
- a second piston received in the brew chamber opposite of the first piston, wherein the drive mechanism is configured to engage with the lead screws to move the carriage relative to the frame to move the brew chamber toward the first piston to drive the first piston into the brew chamber toward the second piston to compact the brewing substance between the first piston and second piston and force brewed beverage out of the brew chamber through the first piston, the drive mechanism is configured to engage with the lead screws to move the carriage relative to the frame to move the brew chamber away from the first piston to engage the second piston with the frame to drive used brewing substance out of the brew chamber, the lead screws are circumferentially spaced apart from the columns relative to the brew chamber, and the brew chamber is replaceable with at least one other brew chamber of the same configuration or a different configuration.

2. The beverage extraction assembly of claim 1, wherein the brew chamber includes a heating element positioned adjacent to a cavity defined by the brew chamber.

3. The beverage extraction assembly of claim 2, wherein an insulating structure is integrated into the brew chamber around the heating element.

4. The beverage extraction assembly of claim 1, wherein the brew chamber is removable from the carriage and replaceable with a brew chamber of a different configuration.

5. The beverage extraction assembly of claim 1, wherein the first piston includes a face, a sleeve, and a compressible gasket, and wherein the sleeve is configured to compress the gasket when the face engages with the brewing substance.

6. The beverage extraction assembly of claim 5, wherein the face is formed to define a filter structure to allow brewed beverage to flow out of the brew chamber through the first piston.

7. The beverage extraction assembly of claim 1, wherein the second piston is configured to allow water from the water system to flow through the second piston into the brew chamber.

8. The beverage extraction assembly of claim 1, wherein the different configuration is a relative size of the other brew chamber.

9. The beverage extraction assembly of claim 1, wherein the different configuration is incorporation of a heater in the other brew chamber.

10. The beverage extraction assembly of claim 1, further comprising an upper beam and a lower beam, wherein the lead screws and the columns extend from the upper beam to the lower beam, and wherein the lead screws are fixed against rotation relative to the upper and lower beams.

11. The beverage extraction assembly of claim 10, wherein the first piston is coupled to the upper beam, and wherein the carriage is positioned between the upper and lower beams for movement toward and away from the first piston.

12. A beverage extraction assembly comprising:
- a frame having at least two spaced apart lead screws and at least two spaced apart columns;
- a drive mechanism coupled to the lead screws;
- a carriage coupled to the drive mechanism for movement with the drive mechanism relative to the frame and coupled to the columns;
- a brew chamber coupled to the carriage for movement with the carriage relative to the frame, the brew chamber configured to receive a brewing substance for forming a brewed beverage when combined with water, the brew chamber positioned between the lead screws and between the columns;

a water system coupled to the brew chamber and configured to deliver water to the brew chamber;

a first piston coupled to the frame and sized to be at least partially received in the brew chamber; and a second piston received in the brew chamber opposite of the first piston, wherein the drive mechanism is configured to engage with the lead screws to move the carriage relative to the frame to move the brew chamber toward the first piston to drive the first piston into the brew chamber toward the second piston to compact the brewing substance between the first piston and second piston and force brewed beverage out of the brew chamber through the first piston, the drive mechanism is configured to engage with the lead screws to move the carriage relative to the frame to move the brew chamber away from the first piston to engage the second piston with the frame to drive used brewing substance out of the brew chamber, and the lead screws are circumferentially spaced apart from the columns relative to the brew chamber.

13. The beverage extraction assembly of claim 12, wherein the brew chamber includes a heating element positioned adjacent to a cavity defined by the brew chamber.

14. The beverage extraction assembly of claim 13, wherein an insulating structure is integrated into the brew chamber around the heating element.

15. The beverage extraction assembly of claim 12, wherein the first piston includes a face, a sleeve, and a compressible gasket, and wherein the sleeve is configured to compress the gasket when the face engages with the brewing substance.

16. The beverage extraction assembly of claim 15, wherein the face is formed to define a filter structure to allow brewed beverage to flow out of the brew chamber through the first piston.

17. The beverage extraction assembly of claim 16, wherein the second piston is configured to allow water from the water system to flow through the second piston into the brew chamber.

18. The beverage extraction assembly of claim 12, further comprising an upper beam and a lower beam, wherein the lead screws and the columns extend from the upper beam to the lower beam, and wherein the lead screws are fixed against rotation relative to the upper and lower beams.

19. The beverage extraction assembly of claim 18, wherein the first piston is coupled to the upper beam, and wherein the carriage is positioned between the upper and lower beams for movement toward and away from the first piston.

* * * * *